United States Patent
Mason

(10) Patent No.: US 7,331,140 B1
(45) Date of Patent: Feb. 19, 2008

(54) PLANT STAKE WITH WIRES AND PEGS IN VERTICALLY SPACED HOLES

(76) Inventor: Paul G. Mason, 19609 7th AV South, DesMoines, WA (US) 98148

( * ) Notice: Subject to any disclaimer, the term of this patent is extended or adjusted under 35 U.S.C. 154(b) by 0 days.

(21) Appl. No.: 11/592,501

(22) Filed: Nov. 3, 2006

(51) Int. Cl.
*A01G 17/04* (2006.01)
(52) U.S. Cl. .......................................................... 47/47
(58) Field of Classification Search .................. 47/44, 47/47, 32.5, 42, 43, 70; 211/85.23, 71.01, 211/85.18; 140/88, 90; 256/57, 62, 34, 256/65.12
See application file for complete search history.

(56) References Cited

U.S. PATENT DOCUMENTS

| | | | | |
|---|---|---|---|---|
| 156,059 A | * | 10/1874 | Jordan | 108/59 |
| 240,874 A | * | 5/1881 | Wright | 256/62 |
| 505,367 A | * | 9/1893 | Paldi | 256/50 |
| 1,268,167 A | * | 6/1918 | Shoecraft | 52/165 |
| 1,531,614 A | * | 3/1925 | Houston | 473/485 |
| 1,587,740 A | * | 6/1926 | Wiswell | 47/47 |
| 1,781,316 A | * | 11/1930 | Brooks | 47/47 |
| 2,053,195 A | * | 9/1936 | Jernegan | 256/57 |
| 3,061,976 A | * | 11/1962 | Carroll et al. | 47/47 |
| 3,521,401 A | * | 7/1970 | Shisler | 47/43 |
| 3,785,619 A | * | 1/1974 | Oltmanns | 256/10 |
| 4,519,162 A | * | 5/1985 | Stuckey | 47/47 |
| 4,750,293 A | * | 6/1988 | Dyke | 47/47 |
| 5,568,700 A | * | 10/1996 | Veneziano et al. | 47/43 |
| 6,299,125 B1 | * | 10/2001 | Zayeratabat | 248/530 |

FOREIGN PATENT DOCUMENTS

DE 29611905 U1 * 9/1996
DE 10210814 A1 * 9/2003

* cited by examiner

*Primary Examiner*—Son T. Nguyen
(74) *Attorney, Agent, or Firm*—Donald W. Meeker

(57) ABSTRACT

A plant support stake has a bottom point for insertion in the ground and a series of vertically spaced holes along the length of the stake spaced at intervals appropriate to securing a plant at different stages in the growth of the plant. A plant support tie, preferably a wire, has one end inserted in a hole at a desired height and a peg inserted in the hole to bind the end of the wire in the hole with an outer portion of the peg protruding from the opening so that the tie encircles the plant and secures to the protruding end of the peg with a tie stop to prevent the tie from slipping off.

8 Claims, 2 Drawing Sheets

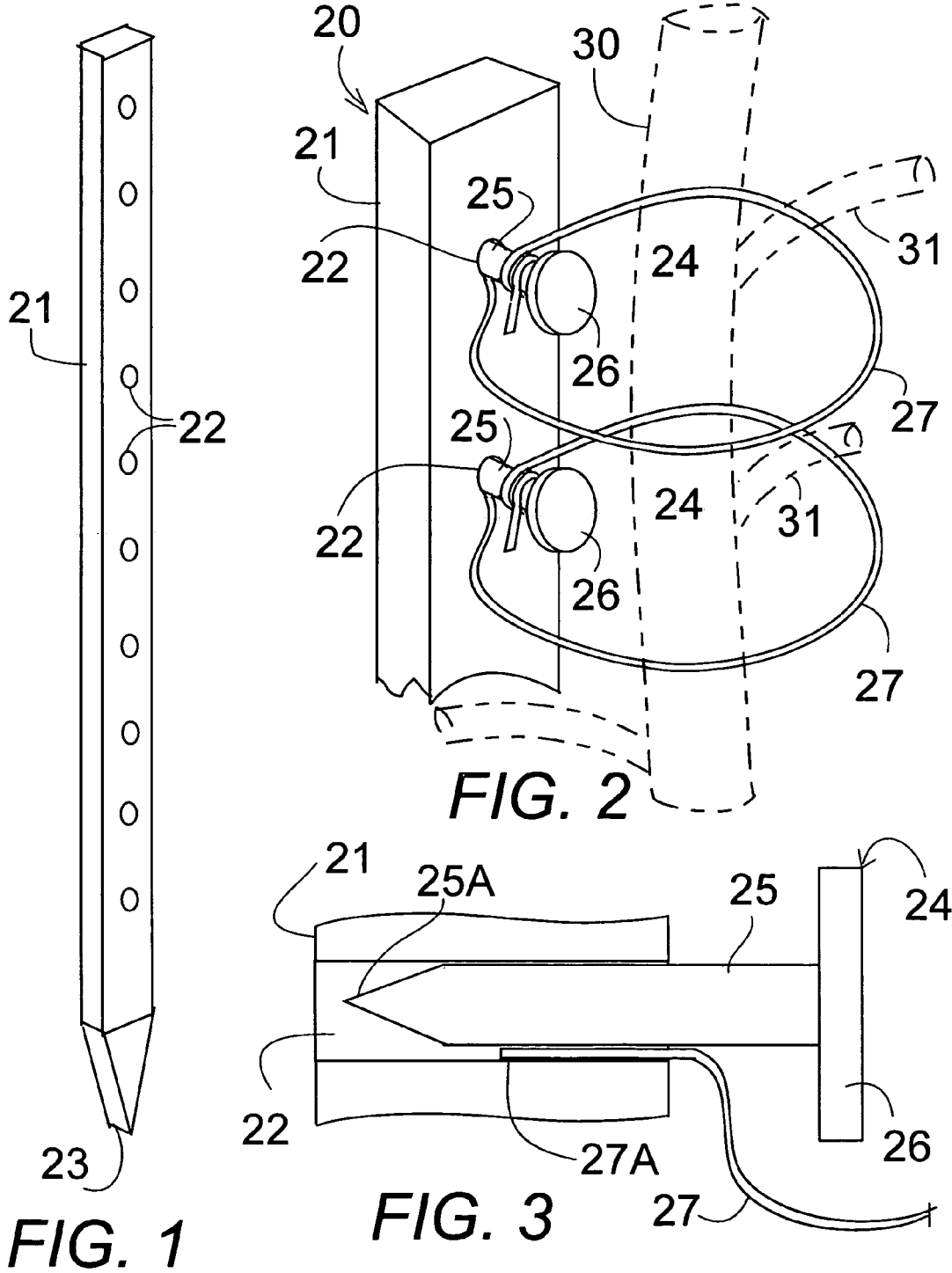

PLANT STAKE WITH WIRES AND PEGS IN VERTICALLY SPACED HOLES

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to plant supports and particularly to a plant support system comprising a stake having a series of incremental vertically spaced oriented holes therein and plant support wires, each wire having a first end inserted into one of the series of holes and secured therein by a peg, which may be a nail or screw, partially driven into the hole and the wire wrapped supportively around the plant and the second end of the wire wound around the peg.

2. Description of Related Art Including Information Disclosed Under 37 CFR 1.97 and 1.98

It is well known in horticulture to provide wooden, plastic or metallic stakes for supporting various vegetables, flowers, and other plants during their growth or at certain stages in their life cycle when the stems are tender and liable to break. Once the stake is in the ground, plant support ties such as twine, wire, or even strips of cloth are used to provide a tie between the plant and the stake. The plant support ties generally must be tied or wrapped around the stake in an unorganized fashion with nothing to prevent the plant support ties from slipping down the stake and nothing to organize the plant support ties into orderly spaced arrays to coincide with the growth of the plant. Prior art patents do not adequately address this problem.

U.S. Pat. No. 2,000,911, issued May 14, 1935 to Balousek, provides a plant support comprising a stake with a plurality of holes therein for lacing the ends of a plant supporting reed or wire through.

U.S. Pat. No. 1,587,740, issued Jun. 8, 1926 to Wiswell, claims a support for plants and bushes which comprises an angled post having spaces holes at right angles to each other and arranged in pairs altitudinally, and open ended loops which may be vertically adjusted by placing the free end portions thereof in a selected pair of holes.

U.S. Pat. No. 1,627,495, issued May 3, 1927 to Effley, indicates a bush or plant support comprising a stake having a series of vertically oriented holes, a plant loop support section, and an adjustably mounted plant supporting loop. A portion of the loop support section matingly engages one of the series of holes.

U.S. Pat. No. 1,781,316, issued Nov. 11, 1930 to Brooks, concerns a plant support comprising a plant support standard with vertically oriented and incrementally spaced apertures therethrough and a vertically adjustable plant supporting loop. The loop maybe held in place by a bent portion of the wire that mates with one of the holes or a pin inserted through a selected hole.

U.S. Patent Application #20030126794, published Jul. 10, 2003 by Wisniewski, claims a thermoplastic garden stake with integrally molded notches for fencing, hooks for plants, and holes for cords provided on the ribs.

U.S. Pat. No. 4,519,162, issued May 28, 1985 to Stuckey, shows a vertical plant support with horizontal hoops. A plant/vine support is provided which comprises a post or stake member adapted to be driven into the earth spaced a distance away from the plant or vine and a plurality of rings, each ring having integrally formed stabilizing members for stabilizing the rings in vertical and horizontal planes and connectors for detachably securing the rings to the post or stake. In one embodiment, pairs of holes in the channel post receives pairs of locking hooks and, in another embodiment, one of the locking hooks is a locking detent.

Two U.S. Pat. Nos. D300,900 issued May 2, 1989 and 4,750,293 issued Jun. 14, 1988 to Dyke, claim a plant support device, which includes a longitudinally extending support member having a first opening formed in a wall portion thereof and a longitudinal opening extending at least part of the length of the support member; a flexible band-like clip member having a first flat end portion positioned in the first opening and within the longitudinal opening; a first straight flat leg portion connected to the first flat end portion; a flexible intermediate leg portion connected to the first leg portion; and a second straight flat leg portion connected to the flexible intermediate leg portion and extending to a position adjacent the first flat end portion.

U.S. Pat. No. D231,628, issued May 7, 1974 to Bartels, describes the ornamental design of a plant stake having a series of vertically oriented holes therein.

U.S. Pat. No. 5,349,780, issued Sep. 27, 1994 to Dyke, discloses a plant support device for supporting plant stems and fencing which includes a support member having serrated rib structures extending the longitudinal length of the support member and hole slots located adjacent to the rib structures which provide a location to attach plant clips or fencing to the support member. An extension member is provided which telescopically inserts into the support member to easily lengthen the plant support device. Various plant clips are provided which attach to the plant support device to support plant stems and fencing.

U.S. Pat. No. 4,021,965, issued May 10, 1977 to Norris, puts forth a plant support stake with an integral support means in the form of plant ties and integral dispensing means for fertilizer and pesticides in the provision of a complete growth support system of an adjacent plant throughout the entire growth and bearing cycle of the plant.

U.S. Pat. No. 5,542,210, issued Aug. 6, 1996 to Hupfl, illustrates an apparatus for supporting various different types of plantlife growing in a ground area including stakes adapted to be inserted into the ground with preferably a pointed end formed of hard plastic preferably recycled. The one or more stakes define a slot extending therethrough adapted to receive a supporting strap of hard or preferably recycled plastic. The supporting strap includes a flat surface adapted to support the shaft of a vertically growing plant or tree without damaging thereto. The strap is preferably generally rectangular in cross section and includes a plurality of studs thereon and defines a plurality of apertures therein. The studs are adapted to extend through the apertures to form the supporting strap into circular formations of varying lengths for supporting of plantlike growing adjacent to the stake. The supporting strap is designed to extend through the preferably rectangular slots in the stakes to facilitate support. A tubular locking device is included for extending about the studs at the location where they are locked with respect to the apertures to facilitate maintaining of retainment therebetween. The tubular locking device preferably extends about the supporting strap and is movable longitudinally thereal ong.

U.S. Pat. No. 4,907,369, issued Mar. 13, 1990 to Vomfell, is for a multi-purpose stake that includes a stake means forming a longitudinal member adapted to be supported substantially perpendicular to a support surface. An aperture means forms at least one pair of laterally spaced apertures in the stake means. Either a belt means is disposed in a pair of apertures and adapted to form an enclosure to support an object thereon of a snap-on means may be used for removably engaging the apertures to support an object thereon.

U.S. Pat. No. 1,377,832, issued May 10, 1921 to Hanner, shows a plant support in which a V-shaped stake provides a support for a wire ring at spaced positions along the intersection of the two sides of the stake. The ring is capable of sliding on the stake between the spaced positions and being secured at the positions by engagement of a bent portion of the ring with apertures in the stake.

What is needed is a plant supporting stake having a series of vertically spaced plant support ties positioned on the stake at appropriate intervals and securely fixed to the stake at those intervals.

BRIEF SUMMARY OF THE INVENTION

An object of the present invention is to provide a plant support stake with a series of vertically spaced holes and a series of plant support ties, such as wires, each with one end inserted in one of the holes and a peg, which may be a nail or screw, partially inserted in the holes to secure the plant support tie in the hole and part of the peg protruding from the hole with a tie stop on the peg so that the plant support tie after encircling the plant at the desired height set by the hole is wrapped around the protruding peg and secured to it with the tie stop preventing the plant support tie from slipping off the peg.

In brief, a plant support stake has a bottom point for insertion in the ground and a series of vertically spaced holes along the length of the stake spaced at intervals appropriate to securing a plant at different stages in the growth of the plant. A plant support tie, preferably a wire, has one end inserted in a hole at a desired height and a peg inserted in the hole to bind the end of the wire in the hole with an outer portion of the peg protruding from the opening. The peg, which could be a nail or screw or other cylindrical or tapered shaft equal to or slightly smaller in diameter than the hole, has a support tie stop to prevent the support tie from slipping off of the peg. After encircling the plant with the wire, it is wrapped around the peg inside of the support tie stop so that the peg retains the support tie in position at the desired height.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings:

FIG. 1 is a perspective view of the stake shaft of the present invention;

FIG. 2 is a perspective view of the stake shaft of FIG. 1 showing two pegs and associated plan support ties in two of the stake holes with one end of each of the wire plant support ties inserted in a hole and a nail peg binding the end of the wire in the hole with the rest of the wire peg wrapped around a plant and the other end of the wire tie wrapped around the nail peg inside of the nail head;

FIG. 3 is a cross-sectional view of a portion of the stake at one of the holes showing the nail peg binding the end of the wire tie in the hole;

DETAILED DESCRIPTION OF THE INVENTION

Figure 4:
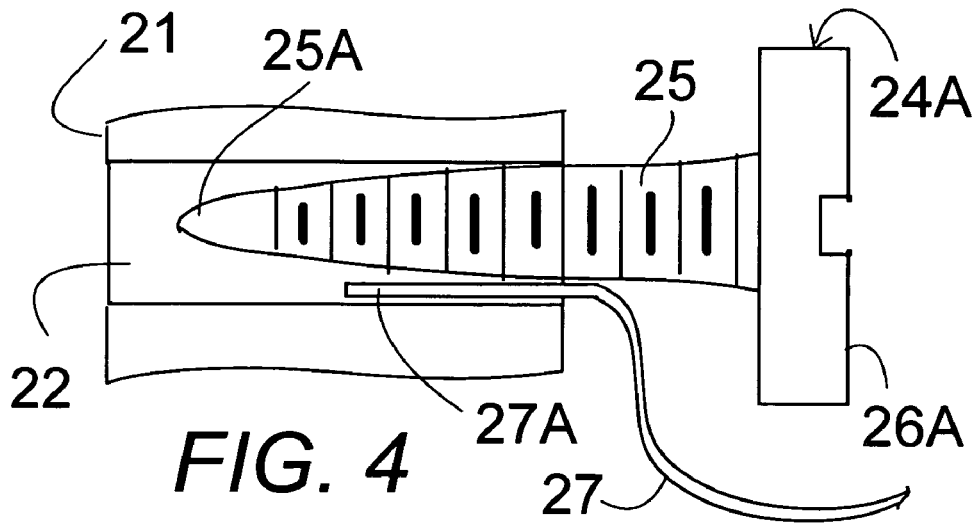
FIG. 4 is a cross-sectional view of a portion of the stake at one of the holes showing the screw peg binding the end of the wire tie in the hole.

In FIGS. 1-6, a plant support device 20 comprises a stake 21 with spaced vertical holes 22, a series of plant support ties 27 with one end inserted in one hole, and a series of pegs 24 and 24A-C with one end binding the end of the support tie in the hole and the plant support tie 27 encircling a plant 30 with the other end of the tie wrapped around the peg.

In FIG. 1, the vertical plant support stake 21 comprises a rigid elongated shaft having a bottom point 23 for insertion in the ground and a series of vertically spaced holes 22 therein along the length of the stake spaced at intervals appropriate to securing a plant at different stages in the growth of the plant. The positions of the vertically spaced holes are preferably positioned so that each hole would be opposite a branch 31 of a plant so that the plant support tie not only encircles the main trunk of the plant but also holds up a branch 31 of the plant, which is especially helpful in supporting plants such as tomato plants which bear heavy fruit, as shown in FIG. 2.

In FIGS. 2 and 3, the series of plant support ties 27 each comprise an elongated malleable strand for encircling a plant, each strand having a first tie end 27A for insertion in one of the holes 22 of the stake 21, an elongated mid portion for encircling a plant, and a second tie end 27B for attaching to the stake via the peg 24. The plant support tie 27 preferably comprises a malleable wire which retains a coiled shape when wrapped around the peg for ease of use and strength and durability particularly wire resistant to rusting from rain or watering the plant.

In FIGS. 2 and 3, the series of pegs 24 each comprise a rigid elongated shaft having at least a mid portion 25 equal to the size of one of the holes and a tapered first peg end 25A insertable in the hole 22 to bind the first tie end 27A therein and a second peg end protruding outside of the hole, the second peg end having a means 26 for retaining a second tie end of a plant support tie wrapped around the second portion of the peg to prevent the plant support tie 27 from slipping off of the peg 24.

In FIG. 3, the peg 24 comprises a nail and the means for retaining the second tie end comprises a protruding head 26 of the nail or, in FIG. 4, the peg 24A may comprise a screw and the means for retaining the second tie end comprises a protruding head 26A of the screw.

Figure 5:
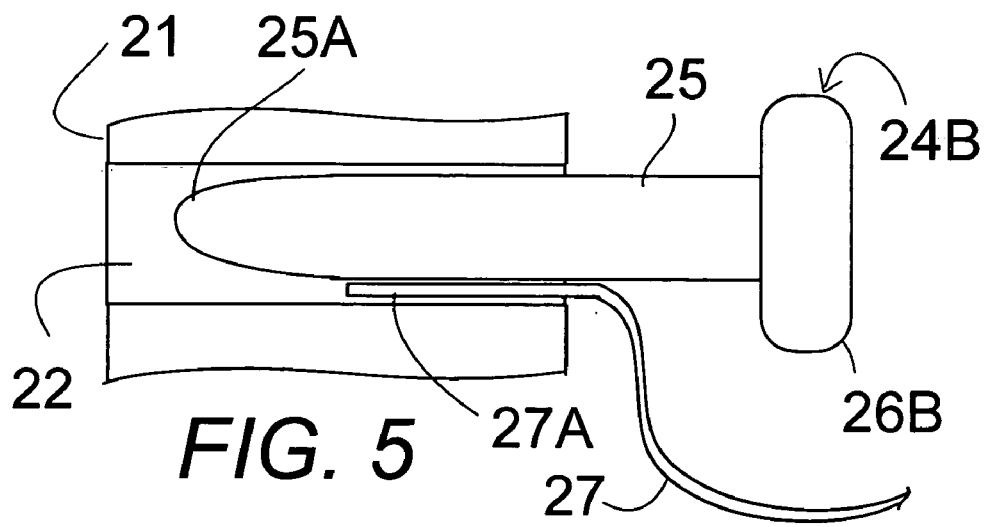
FIG. 5 is a cross-sectional view of a portion of the stake at one of the holes showing the peg with a protrusion binding the end of the wire tie in the hole.
Figure 6:
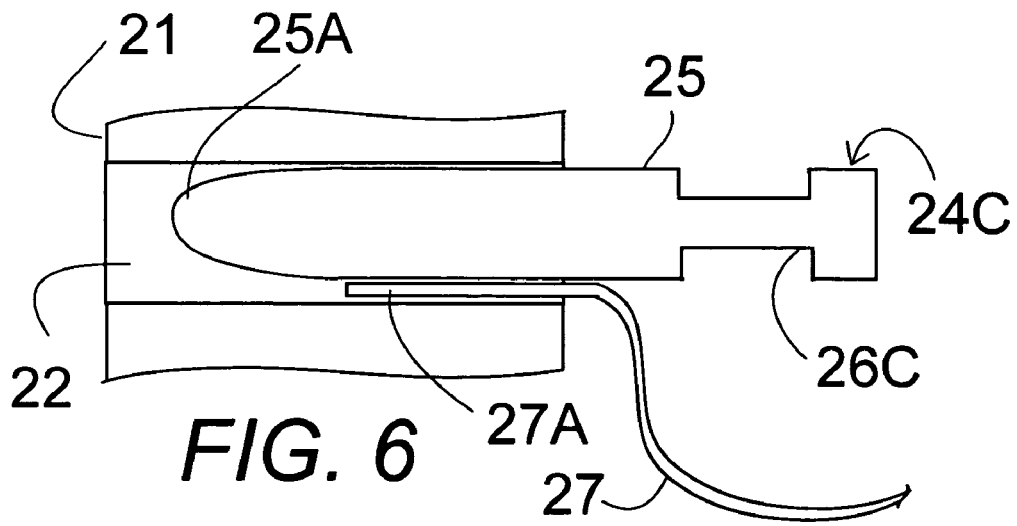
FIG. 6 is a cross-sectional view of a portion of the stake at one of the holes showing the peg with a recessed groove binding the end of the wire tie in the hole.

Alternately, in FIG. 5, the peg 24B may comprise a rigid shaft 24B and the means for retaining the second tie end may comprise a circumferential protrusion 26B or, in FIG. 6, the peg 24C may comprise a circumferential groove 26C to receive the end of the tie wound into the groove on the outer end of the shaft.

The rigid shaft may be fabricated from at least one of the materials taken from a list of materials including wood, plastic, and metal, and preferably a rust resistant material.

It is understood that the preceding description is given merely by way of illustration and not in limitation of the invention and that various modifications may be made thereto without departing from the spirit of the invention as claimed.

What is claimed is:

1. A plant support device comprising:
   a vertical plant support stake comprising a rigid elongated shaft having a bottom point for insertion in the ground and a series of vertically spaced holes therein along the length of the stake spaced at intervals appropriate to securing a plant at different stages in the growth of the plant;
   a series of pegs each comprising a rigid elongated shaft having at least a mid portion equal to the size of one of the holes and a tapered first peg end and a second peg end positioned outside of the hole; a series of plant support ties each comprising an elongated malleable strand for encircling a plant, each strand having a first tie end inserted in one of the holes of the stake, an elongated mid portion for encircling a plant, and a second tie end attached to said second peg end; wherein said tapered first peg end inserted in the hole to bind the first tie end therein, and said second peg end having a means for retaining a second tie end of a plant support tie wrapped around the second peg end of the peg to prevent the plant support tie from slipping off of the peg.

2. The device of claim 1 wherein the plant support tie comprises a malleable wire which retains a coiled shape when wrapped around the peg.

3. The device of claim 1 wherein the peg comprises a nail and the means for retaining the second tie end comprises a protruding head of the nail.

4. The device of claim 1 wherein the peg comprises a screw and the means for retaining the second tie end comprises a protruding head of the screw.

5. The device of claim 1 wherein the peg comprises a rigid shaft and the means for retaining the second tie end comprises a circumferential protrusion on the outer end of the shaft.

6. The device of claim 5 wherein the rigid shaft is fabricated from at least one of the materials taken from a list of materials including wood, plastic, and metal.

7. The device of claim 1 wherein the peg comprises a rigid shaft and the means for retaining the second tie end comprises a circumferential groove on the outer end of the shaft for receiving the wrapped support tie therein.

8. The device of claim 7 wherein the rigid shaft is fabricated from at least one of the materials taken from a list of materials including wood, plastic, and metal.

* * * * *